United States Patent
Liu et al.

(10) Patent No.: US 11,518,880 B2
(45) Date of Patent: Dec. 6, 2022

(54) THERMOPLASTIC POLYCARBONATE COMPOSITIONS WITH IMPROVED HYDROLYTIC STABILITY AND ELECTRICAL TRACKING RESISTANCE AND SHAPED ARTICLES THEREOF

(71) Applicant: SHPP Global Technologies B.V., Bergen op Zoom (NL)

(72) Inventors: Xing Liu, Bergen op Zoom (NL); Wei Shan, Bergen op Zoom (NL); Jian Wang, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 115 days.

(21) Appl. No.: 17/081,734

(22) Filed: Oct. 27, 2020

(65) Prior Publication Data

US 2021/0222002 A1    Jul. 22, 2021

(30) Foreign Application Priority Data

Jan. 17, 2020    (EP) .................................... 20152445

(51) Int. Cl.
| | |
|---|---|
| *C08L 69/00* | (2006.01) |
| *C08L 51/08* | (2006.01) |
| *C08L 23/08* | (2006.01) |
| *H01R 13/527* | (2006.01) |

(52) U.S. Cl.
CPC ............. *C08L 69/005* (2013.01); *C08L 69/00* (2013.01); *H01R 13/527* (2013.01); *C08L 2201/08* (2013.01); *C08L 2203/20* (2013.01); *C08L 2205/025* (2013.01); *C08L 2205/035* (2013.01); *C08L 2207/53* (2013.01)

(58) Field of Classification Search
None
See application file for complete search history.

(56) References Cited

U.S. PATENT DOCUMENTS

| | | |
|---|---|---|
| 3,929,908 A | 12/1975 | Orlando et al. |
| 4,170,700 A | 10/1979 | Sweet |
| 4,888,388 A | 12/1989 | Hongo et al. |
| 4,923,933 A | 5/1990 | Curry |
| 4,963,619 A | 10/1990 | Wittmann et al. |
| 6,984,694 B2 | 1/2006 | Blasius, Jr. et al. |
| 7,615,594 B2 | 11/2009 | Hashimoto et al. |
| 2007/0082989 A1* | 4/2007 | Glasgow ................ C08K 5/109 524/284 |
| 2012/0248102 A1 | 10/2012 | Van De Wetering et al. |
| 2012/0248384 A1 | 10/2012 | Van De Wetering et al. |
| 2013/0131255 A1 | 5/2013 | Pottie et al. |

FOREIGN PATENT DOCUMENTS

| | | |
|---|---|---|
| EP | 2691461 B1 | 11/2017 |
| JP | 2014001374 | * 1/2014 |
| JP | 2014095033 A | 5/2014 |
| WO | 2013175448 A1 | 11/2013 |
| WO | 2014072923 A1 | 5/2014 |
| WO | 2019130081 A1 | 7/2019 |

OTHER PUBLICATIONS

Teijin Resin & Plastic Processing Business Unit "Brominated Flame Retardant FG Series" pp. 1-12 (no date). (Year: 0000).*

* cited by examiner

*Primary Examiner* — David J Buttner
(74) *Attorney, Agent, or Firm* — Cantor Colburn LLP

(57) ABSTRACT

A thermoplastic polycarbonate composition comprising: 10 to 30 wt % of a brominated polycarbonate; 10 to 80 wt % of a homopolycarbonate; optionally, 1 to 60 wt % of an aromatic poly(ester-carbonate) comprising carbonate units derived from bisphenol A, resorcinol, or a combination thereof, and ester units derived from a bisphenol, preferably bisphenol A, or resorcinol, and terephthalic acid, isoterephthalic acid, or a combination thereof, wherein a molar ratio of carbonate units to ester units ranges from 1:99 to 99:1; 5 to 15 wt % of a core-shell impact modifier; 1 to 10 wt % of an α,β-unsaturated glycidyl ester copolymer impact modifier; 0.01 to 1 wt % of a hydrostabilizer, preferably an epoxy hydrostabilizer; optionally, 0.1 to 10 wt % of an additive composition; wherein the wt % of each component is based on the total weight of the composition, which totals 100 wt %.

19 Claims, No Drawings

THERMOPLASTIC POLYCARBONATE COMPOSITIONS WITH IMPROVED HYDROLYTIC STABILITY AND ELECTRICAL TRACKING RESISTANCE AND SHAPED ARTICLES THEREOF

CROSS REFERENCE TO RELATED APPLICATION

This application is a non-provisional application which claims priority to European Patent Application No. 20152445.1, filed on Jan. 17, 2020, the content of which is incorporated in its entirety by reference.

BACKGROUND

This disclosure relates to thermoplastic polycarbonate compositions, and in particular to thermoplastic polycarbonate compositions, methods of manufacture, and uses thereof.

Polycarbonates are useful in the manufacture of articles and components for a wide range of applications, from automotive parts to electronic appliances. Because of their broad use, particularly in electrical applications, it is desirable to provide polycarbonates with improved hydrolytic stability and electrical tracking resistance.

There accordingly remains a need in the art for thermoplastic polycarbonate compositions that have improved hydrolytic stability and electrical tracking resistance. It would be a further advantage if thermoplastic polycarbonate compositions had improved impact resistance, thermal properties, and flame retardance.

SUMMARY

The above-described and other deficiencies of the art are met by a thermoplastic composition comprising: 10 to 30 wt % of a brominated polycarbonate; 10 to 80 wt % of a homopoly carbonate; optionally, 1 to 60 wt % of an aromatic poly(ester-carbonate) comprising carbonate units derived from bisphenol A, resorcinol, or a combination thereof, and ester units derived from a bisphenol, preferably bisphenol A, or resorcinol, and terephthalic acid, isoterephthalic acid, or a combination thereof, wherein a molar ratio of carbonate units to ester units ranges from 1:99 to 99:1; 5 to 15 wt % of a core-shell impact modifier; 1 to 10 wt % of an α,β-unsaturated glycidyl ester copolymer impact modifier; 0.01 to 1 wt % of a hydrostabilizer, preferably an epoxy hydrostabilizer; optionally, 0.1 to 10 wt % of an additive composition; wherein the wt % of each component is based on the total weight of the composition, which totals 100 wt %.

In another aspect, a method of manufacture comprises combining the above-described components to form a thermoplastic polycarbonate composition.

In yet another aspect, an article comprises the above-described thermoplastic composition.

In still another aspect, a method of manufacture of an article comprises molding, extruding, or shaping the above-described thermoplastic composition into an article.

The above described and other features are exemplified by the following detailed description, examples, and claims.

DETAILED DESCRIPTION

Conventional polycarbonate compositions presently used in electrical connectors cannot meet high-end (e.g., 1500 V) application requirements with respect to electrical tracking over the entire 300-600 V range, while also providing hydrolytic stability, low-temperature impact performance, and flame retardance. The inventors hereof have discovered polycarbonate compositions with improved electrical properties over the entire 300-600 V range, improved tracking performance, low temperature impact properties, and flame retardance. The polycarbonate compositions include a brominated polycarbonate, a homopolycarbonate, a core-shell impact modifier, an α,β-unsaturated glycidyl ester copolymer impact modifier, and a hydrostabilizer. The polycarbonate compositions have improved tracking performance, wherein a molded sample of the composition does not show tracking after 50 drops of 0.1% ammonium chloride solution measured at both 300 V and 600 V, each as determined by ASTM D-3638-85. The hydrolytic stability of the polycarbonate compositions is also improved, wherein a molded sample of the composition displays improved molecular weight retention as compared with conventional formulations: greater than 85% (1000 hours), greater than 79% (1500 hours), greater than 73% (2000 hours), or greater than 62% (3000 hours), as measured in a hydrolytic chamber at 85° C. and 85% relative humidity. The impact performance is improved, wherein a molded sample (3.2 mm) of the composition have a notched Izod impact of greater than 260 Joules per meter (J/m) at −30° C. and greater than 180 J/m at −40° C., each measured according to ASTM D256.

The thermoplastic polycarbonate compositions include a brominated polycarbonate, a homopolycarbonate, a core-shell impact modifier, an α,β-unsaturated glycidyl ester copolymer impact modifier, and a hydrostabilizer. The individual components of the thermoplastic polycarbonate compositions are described in further detail below.

"Polycarbonate" as used herein means a polymer having repeating structural carbonate units of formula (1)

(1)

in which at least 60% of the total number of $R^1$ groups contain aromatic moieties and the balance thereof are aliphatic, alicyclic, or aromatic. In an aspect, each $R^1$ is a $C_{6-30}$ aromatic group, that is, contains at least one aromatic moiety. $R^1$ can be derived from an aromatic dihydroxy compound of the formula HO—$R^1$—OH, in particular of formula (2)

$$\text{HO-A}^1\text{-Y}^1\text{-A}^2\text{-OH} \qquad (2)$$

wherein each of $A^1$ and $A^2$ is a monocyclic divalent aromatic group and $Y^1$ is a single bond or a bridging group having one or more atoms that separate $A^1$ from $A^2$. In an aspect, one atom separates $A^1$ from $A^2$. Preferably, each $R^1$ can be derived from a bisphenol of formula (3)

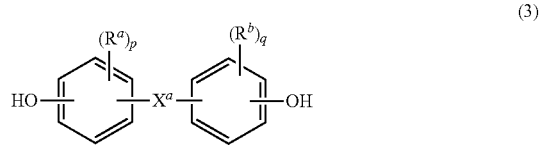

(3)

wherein $R^a$ and $R^b$ are each independently a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (preferably para) to each other on the $C_6$ arylene group. In an aspect, the bridging group $X^a$ is single bond, —O—, —S—, —S(O)—, —S(O)$_2$—, —C(O)—, or a $C_{1-60}$ organic group. The organic bridging group can be cyclic or acyclic, aromatic or non-aromatic, and can further comprise heteroatoms such as halogens, oxygen, nitrogen, sulfur, silicon, or phosphorous. The $_{1-60}$ organic group can be disposed such that the $C_6$ arylene groups connected thereto are each connected to a common alkylidene carbon or to different carbons of the $C_{1-60}$ organic bridging group. In an aspect, p and q is each 1, and $R^a$ and $R^b$ are each a $C_{1-3}$ alkyl group, preferably methyl, disposed meta to the hydroxy group on each arylene group.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3, 5,6-tetrabromo hydroquinone, or the like, or a combination thereof.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis (4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). A combination can also be used. In a specific aspect, the polycarbonate is a linear homopolymer derived from bisphenol A, in which each of $A^1$ and $A^2$ is p-phenylene and $Y^1$ is isopropylidene in formula (3).

The thermoplastic polycarbonate compositions include a homopolycarbonate (wherein each $R^1$ in the polymer is the same). In an aspect, the homopolycarbonate in the thermoplastic poly carbonate composition is derived from a bisphenol of formula (2), preferably bisphenol A, in which each of $A^1$ and $A^2$ is p-phenylene and $Y^1$ is isopropylidene in formula (2). The homopolycarbonate can have an intrinsic viscosity, as determined in chloroform at 25° C., of 0.3-1.5 deciliters per gram (dl/gm), preferably 0.45-1.0 dl/gm. The homopolycarbonate can have a weight average molecular weight (Mw) of 10,000-200,000 grams per mol (g/mol), preferably 20,000-100,000 g/mol, as measured by gel permeation chromatography (GPC), using a crosslinked styrene-divinylbenzene column and calibrated to bisphenol A homopoly carbonate references. GPC samples are prepared at a concentration of 1 mg per ml and are eluted at a flow rate of 1.5 ml per minute. In some aspects, the homopolycarbonate is a bisphenol A homopoly carbonate made by a melt process, a bisphenol A homopolycarbonate made by an interfacial process, or a mixture of a bisphenol A homopolycarbonate made by a melt process and a bisphenol A homopolycarbonate made by an interfacial process, wherein the bisphenol A homopolycarbonate has a Mw of 18,000-35,000 g/mole, preferably 20,000-25,000 g/mol; a Mw of 25,000-35,000 g/mol, preferably 27,000-32,000 g/mol, each as measured as described above. The homopolycarbonate can be present from 10-80 wt %, 20-80 wt %, 30-80 wt %, 40-80 wt %, 50-80 wt %, or 60-80 wt %, each based on the total weight of the thermoplastic polycarbonate composition.

In some aspects, the homopolycarbonate is a bisphenol A homopolycarbonate made by a melt process or a mixture of a bisphenol A homopolycarbonate made by a melt process and a bisphenol A homopolycarbonate made by an interfacial process. When the bisphenol A homopolycarbonate made by a melt process is used in combination with a bisphenol A homopolycarbonate made by an interfacial process, the bisphenol A homopoly carbonate made by a melt process is present from 10-80 wt %, 10-60 wt %, 20-60 wt %, 25-60 wt %, 30-60 wt %, 35-60 wt %, 40-60 wt %, 45-60 wt %, 10-50 wt %, 20-50 wt %, 25-50 wt %, 30-50 wt %, 35-50 wt %, or 40-50 wt %, each based on the total weight of the thermoplastic polycarbonate composition. When present, the bisphenol A homopolycarbonate made by an interfacial process is present from 10-30 wt %, 10-25 wt %, 15-30 wt %, or 15-25 wt %, each based on the total weight of the thermoplastic polycarbonate composition.

The thermoplastic polycarbonate compositions include a brominated polycarbonate that differs from the homopolycarbonate. A combination of different brominated polycarbonates can be used. The brominated polycarbonate can be an oligomer or a polymer, and can be derived from an aromatic dihydroxy compound of formula (2) wherein each $R^h$ is bromine and n is 1 to 4; or a bisphenol of formula (3), wherein $X^a$ is as defined for formula (3), p and q are each independently 0 to 4, provided that the sum of p and q is at least 1, and $R^a$ is independently at each occurrence $C_{1-3}$ methyl, $C_{1-3}$ alkoxy, or bromine, provided that at least one $R^a$ is bromine. In an aspect, a combination of two or more different brominated aromatic dihydroxy compounds can be used. Alternatively, the brominated polycarbonate can be derived from a combination of brominated and non-brominated aromatic dihydroxy compounds. If a non-brominated aromatic dihydroxy compound is used, any of the above-described bisphenols (3) can be used. In an aspect, when a non-brominated aromatic dihydroxy compound is used, the non-brominated aromatic dihydroxy compound can be bisphenol A. If a combination of brominated and non-brominated aromatic dihydroxy compounds is used, then preferably the combination includes at least 25 mole % (mol %) of the brominated dihydroxy aromatic compound, more preferably at least 25 to 55 mol % of the brominated dihydric phenol, so as to yield a flame retardant brominated polycarbonate. Branched brominated polycarbonate oligomers can also be used, as can compositions of a linear brominated polycarbonate oligomer and a branched brominated polycarbonate oligomer. Combinations of different brominated copolycarbonate oligomers can be used. Exemplary brominated polycarbonates are disclosed in U.S. Pat. No. 4,923,933 to Curry, U.S. Pat. No. 4,170,700 to Orlando et al., and U.S. Pat. No. 3,929,908 to Orlando et al.

The brominated polycarbonate can have a bromine content of 10 to 50 wt %, 15 to 40 wt %, 20 to 30 wt %, or 24 to 27.5 wt % each based on the weight of the brominated polycarbonate. Optionally the brominated polycarbonate can have phenol or 2,4,6-tribromophenol endcaps. The brominated polycarbonate can have an intrinsic viscosity of 0.2 to 1.5 deciliter per gram, measured in methylene chloride at 25° C. Within this range, the intrinsic viscosity can be 0.4 to 1 deciliter per gram. The brominated polycarbonate can have a Mw of 1,000 to 30,000 g/mol, for example 1,000 to 18,000 g/mol, or 2,000 to 15,000 g/mol, or 3,000 to 12,000 g/mol; or, alternatively 15,000 to 25,000 g/mol, or 20,000 to 25,000 g/mol. The brominated polycarbonates can branched or linear, or a combination of branched and linear brominated polycarbonates can be used.

In an aspect, the brominated aromatic dihydroxy compound can be 2,2-bis(3,5-dibromo-4-hydroxyphenyl)propane (2',6,6'-tetrabromo-4,4'-isopropylidenediphenol (TBBPA)), bis(3,5-dibromo-4-hydroxyphenyOmenthanone, or 2,2',6,6'-tetramethyl-3,3',5,5'-tetrabromo-4,4'-biphenyl; and the non-brominated aromatic dihydroxy compounds for copolymerization with the brominated aromatic dihydroxy compounds include bisphenol A, bis(4-hydroxyphenyl)methane, 2, 2-bis(4-hydroxy-3-methylphenyl)propane, 4,4-bis(4-hydroxyphenyl)heptane, and (3,3'-dichloro-4,4'-dihydroxydiphenyl)methane. In another preferred aspect, the brominated polycarbonate includes brominated carbonate units derived from TBBPA and carbonate units derived from bisphenol A, and more preferably comprises 30 to 70 wt % of TBBPA and 30 to 70 wt % of bisphenol A, or 45 to 55 wt % of TBBPA and 45 to 55 wt % of bisphenol A.

The thermoplastic polycarbonate compositions can comprise 10-30 wt %, 10-20 wt %, 10-25 wt %, 20-30 wt %, 15-30 wt %, 15-25 wt %, or 15-20 wt % of the brominated polycarbonate, each based on the total weight of the composition, which totals 100 wt %. The brominated polycarbonate can be used in an amount that contributes 2 to 20 wt % of bromine to the composition, based on the total weight of the composition.

The thermoplastic polycarbonate composition can include an aromatic poly(ester-carbonate). Such polycarbonates further contain, in addition to recurring carbonate units of formula (1), repeating ester units of formula (3)

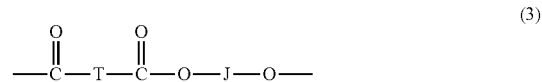

(3)

wherein J is a divalent group derived from an aromatic dihydroxy compound (including a reactive derivative thereof), such as a bisphenol of formula (2), e.g., bisphenol A; and T is a divalent group derived from an aromatic dicarboxylic acid (including a reactive derivative thereof), preferably isophthalic or terephthalic acid wherein the weight ratio of isophthalic acid to terephthalic acid is 91:9 to 2:98. Copolyesters containing a combination of different T or J groups can be used. The polyester units can be branched or linear.

In an aspect, J is derived from a bisphenol of formula (2), e.g., bisphenol A. In another aspect, J is derived from an aromatic dihydroxy compound, e.g, resorcinol. A portion of the groups J, for example up to 20 mole % (mol %) can be a $C_2$-30 alkylene group having a straight chain, branched chain, or cyclic (including polycyclic) structure, for example ethylene, n-propylene, i-proplyene, 1,4-butylene, 1,4-cyclohexylene, or 1,4-methylenecyclohexane. Preferably, all J groups are aromatic.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination thereof. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, or a combination thereof. A specific dicarboxylic acid comprises a combination of isophthalic acid and terephthalic acid wherein the weight ratio of isophthalic acid to terephthalic acid is 91:9 to 2:98. A portion of the groups T, for example up to 20 mol %, can be aliphatic, for example derived from 1,4-cyclohexane dicarboxylic acid. Preferably all T groups are aromatic.

The molar ratio of ester units to carbonate units in the polycarbonates can vary broadly, for example 1:99 to 99:1, preferably 10:90 to 90:10, more preferably 25:75 to 75:25, or 2:98 to 15:85, depending on the desired properties of the final composition.

Specific poly(ester-carbonate)s are those including bisphenol A carbonate units and isophthalate/terephthalate-bisphenol A ester units, i.e., a poly(bisphenol A carbonate)-co-(bisphenol A-phthalate-ester) of formula (4a)

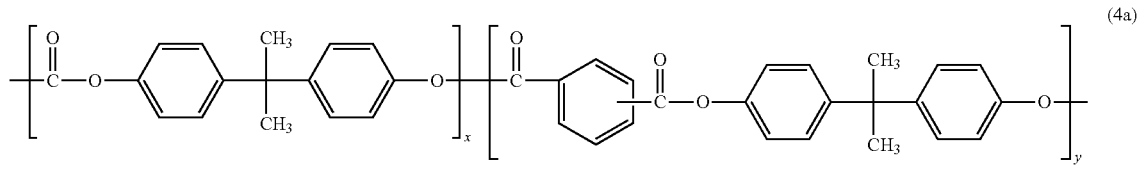

(4a)

wherein x and y represent the wt % of bisphenol A carbonate units and isophthalate/terephthalate-bisphenol A ester units, respectively. Generally, the units are present as blocks. In an aspect, the weight ratio of carbonate units x to ester units y in the polycarbonates is 1:99 to 50:50, or 5:95 to 25:75, or 10:90 to 45:55. Copolymers of formula (5) comprising 35-45 wt % of carbonate units and 55-65 wt % of ester units, wherein the ester units have a molar ratio of isophthalate to terephthalate of 45:55 to 55:45 are often referred to as poly(carbonate-ester)s (PCE). Copolymers comprising 15-25 wt % of carbonate units and 75-85 wt % of ester units, wherein the ester units have a molar ratio of isophthalate to terephthalate from 98:2 to 88:12 are often referred to as poly(phthalate-carbonate)s (PPC).

In another aspect, the high heat poly(ester-carbonate) is a poly(carbonate-co-monoarylate ester) of formula (4b) that includes aromatic carbonate units (1) and repeating monoarylate ester units

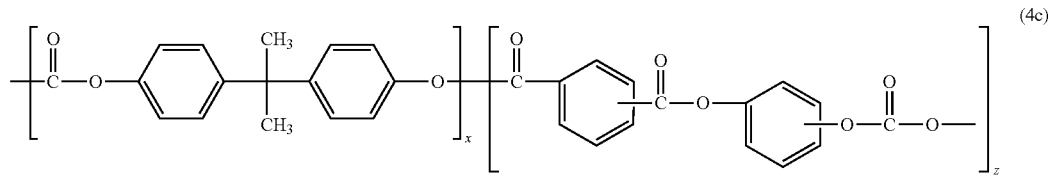

(4b)

wherein $R^1$ is as defined in formula (1), and each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0-4. Preferably, each $R^h$ is independently a $C_{1-4}$ alkyl, and n is 0-3, 0-1, or 0. The mole ratio of carbonate units x to ester units z can be from 99:1 to 1:99, or from 98:2 to 2:98, or from 90:10 to 10:90. In an aspect the mole ratio of x:z is from 50:50 to 99:1, or from 1:99 to 50:50.

In an aspect, the poly(ester-carbonate) comprises aromatic ester units and monoarylate ester units derived from the reaction of a combination of isophthalic and terephthalic diacids (or a reactive derivative thereof) with resorcinol (or a reactive derivative thereof) to provide isophthalate/terephthalate-resorcinol ("ITR" ester units). The ITR ester units can be present in the high heat poly(ester-carbonate) in an amount greater than or equal to 95 mol %, preferably greater than or equal to 99 mol %, and still more preferably greater than or equal to 99.5 mol %, based on the total moles of ester units in the polycarbonate. A preferred high heat poly(ester-carbonate) comprises bisphenol A carbonate units, and ITR ester units derived from terephthalic acid, isophthalic acid, and resorcinol, i.e., a poly(bisphenol A carbonate-co-isophthalate/terephthalate-resorcinol ester) of formula (c)

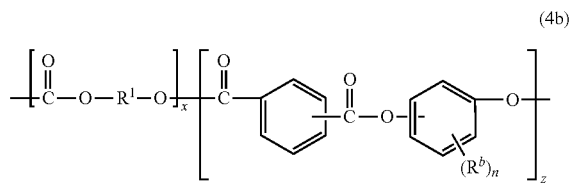

(4c)

wherein the mole ratio of x:z is from 98:2 to 2:98, or from 90:10 to 10:90. In an aspect the mole ratio of x:z is from 50:50 to 99:1, or from 1:99 to 50:50. The ITR ester units can be present in the poly(bisphenol A carbonate-co-isophthalate-terephthalate-resorcinol ester) in an amount greater than or equal to 95 mol %, preferably greater than or equal to 99 mol %, and still more preferably greater than or equal to 99.5 mol %, based on the total moles of ester units in the copolymer. Other carbonate units, other ester units, or a combination thereof can be present, in a total amount of 1 to 20 mole %, based on the total moles of units in the copolymers, for example monoaryl carbonate units of formula (5) and bisphenol ester units of formula (3a):

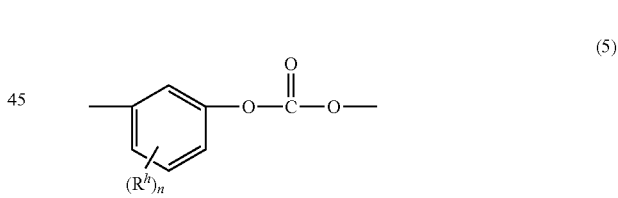

(5)

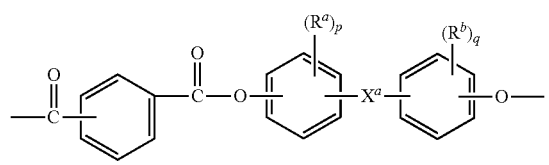

(3a)

wherein, in the foregoing formulae, $R^h$ is each independently a $C_{1-10}$ hydrocarbon group, n is 0-4, $R^a$ and $R^b$ are each independently a $C_{1-12}$ alkyl, p and q are each independently integers of 0-4, and $X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group. The bisphenol ester units can be bisphenol A phthalate ester units of the formula (3b)

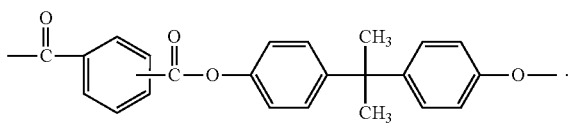

(3b)

In an aspect, the poly(bisphenol A carbonate-co-isophthalate/terephthalate-resorcinol ester) (4c) comprises 1-90 mol % of bisphenol A carbonate units, 10-99 mol % of isophthalic acid-terephthalic acid-resorcinol ester units, and optionally 1-60 mol % of resorcinol carbonate units, isophthalic acid-terephthalic acid-bisphenol A phthalate ester units, or a combination thereof. In another aspect, poly (bisphenol A carbonate-co-isophthalate/terephthalate resorcinol ester) (6) comprises 10-20 mol % of bisphenol A carbonate units, 20-98 mol % of isophthalic acid-terephthalic acid-resorcinol ester units, and optionally 1-60 mol % of resorcinol carbonate units, isophthalic acid-terephthalic acid-bisphenol A phthalate ester units, or a combination thereof.

The poly(ester-carbonate)s can have an Mw of 2,000-100,000 g/mol, preferably 3,000-75,000 g/mol, more preferably 4,000-50,000 g/mol, more preferably 5,000-35,000 g/mol, and still more preferably 17,000-30,000 g/mol. Molecular weight determinations are performed using GPC using a cross linked styrene-divinyl benzene column, at a sample concentration of 1 milligram per milliliter, and as calibrated with bisphenol A homopolycarbonate standards. Samples are eluted at a flow rate of 1.0 ml/min with methylene chloride as the eluent.

Polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

The thermoplastic polycarbonate compositions can have improved impact resistance at −30° C. and −40° C. as compared with conventional formulations. To that end, the thermoplastic polycarbonate compositions include a core-shell impact modifier and an α,β-unsaturated glycidyl ester copolymer impact modifier. In some aspects, poly(carbonate-siloxane)s are absent.

The thermoplastic polycarbonate compositions include a core-shell impact modifier. In some aspects, the core-shell impact modifier is a core-shell silicone-(meth)acrylate impact modifier that includes a rubbery silicone core and a grafted rigid (meth)acrylate shell rigid shell. The silicone core can comprise dimethyl siloxane units. The (meth) acrylate monomers used to form the shell are generally a combination of a monofunctional and a copolymerizable polyfunctional (meth)acrylate monomer. Examples of monofunctional (meth)acrylate monomers include branched or straight chain ($C_{1-8}$ alkyl) (meth)acrylates and glycidyl (meth)acrylate, and examples of copolymerizable polyfunctional monomers include allyl (meth)acrylate, ethylene glycol dimethacrylate, and 1,3-butylene glycol dimethacrylate. Preferred monomers are the $C_{1-6}$ alkyl methacrylates such as methyl methacrylate. Other monomers can optionally be present in the silicone core or the rigid shell, for example styrene, α-methylstyrene, halogen or $C_{1-3}$ alkyl substituted styrene, acrylonitrile, methacrylonitrile, maleic acid, maleic anhydride, $C_{1-4}$ alkyl and phenyl N-substituted maleimide, divinyl benzene, triallyl cyanurate, triallyl isocyanurate, diallyl phthalate, and the like.

Methods for preparing the core-shell silicone-(meth)acrylate impact modifiers are known in the art, as described for example in U.S. Pat. Nos. 7,615,594, 4,888,388, and 4,963,619. The silicone (meth)acrylate impact modifiers can be prepared by emulsion polymerization, wherein, for example a silicone rubber monomer is reacted with a first graft link monomer to form a silicone rubber latex, in the presence of a surfactant such as dodecylbenzenesulfonic acid. Alternatively, a cyclic siloxane such as cyclooctamethyltetrasiloxane and a tetraethoxyorthosilicate can be reacted with a first graft link monomer such as (gamma-methacryloxypropyl)methyl dimethoxysilane. The monofunctional (meth) acrylate monomer is then polymerized with the silicone rubber particles, optionally in presence of a cross linking monomer, such as allyl methacrylate, in the presence of a free radical generating polymerization catalyst such as benzoyl peroxide. In an aspect the impact modifier is prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and can catalyze transesterification or degradation of polycarbonates. Instead, ionic sulfate, sulfonate, or phosphate surfactants can be used in preparing the impact modifiers, particularly the elastomeric substrate portion of the impact modifiers. Useful surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, or a combination thereof. A specific surfactant is a $C_{6-16}$, preferably a $C_{8-12}$ alkyl sulfonate. This emulsion polymerization process is described and disclosed in various patents and literature of such companies as Dow and General Electric Company.

The core-shell silicone-(meth)acrylate impact modifier can have a rubber content of 30 to 90 wt %; and a silicon core content of 50 to 80 wt %, or 60 to 70 wt %, or 65 to 75 wt %. This silicone (meth)acrylate impact modifier can have an average particle size of 100 nanometers to 2 micrometers.

In an aspect, the particle size is 200 to 400 nm, or greater than 400 nm, or greater than 500 nm.

Specific core-shell silicone-(meth)acrylate impact modifiers that can be used include those available commercially, e.g., from Mitsubishi Rayon Co. Ltd., under the trade names METABLEN S-2001, METABLEN S-2100, METABLEN S-2200, and METABLEN S-2501.

The thermoplastic polycarbonate composition can comprise 5-15 wt % of the core-shell impact modifier, such as 5-12 wt %, 5-10 wt %, or 5-8 wt %, each based on the total weight of the thermoplastic polycarbonate composition.

The thermoplastic polycarbonate compositions include an α,β-unsaturated glycidyl ester copolymer impact modifer. The α,β-unsaturated glycidyl ester repeating units can have the structure:

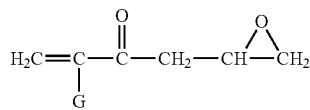

wherein G is hydrogen or a $C_{1-10}$ alkyl. Exemplary α,β-unsaturated glycidyl ester repeating units include glycidyl acrylate, glycidyl methacrylate, and glycidyl ethacrylate. In addition to the α,β-unsaturated glycidyl ester repeating units, the α,β-unsaturated glycidyl ester copolymer can further comprise repeating units derived from an α-olefin, for example ethylene, propylene, 1-butene, and 1-hexene. In some aspects, the α-olefin is ethylene. The α,β-unsaturated glycidyl ester-copolymer can further comprise repeating units derived from a vinyl ester or a $C_{1-12}$ alkyl (meth)acrylate. Examples of vinyl esters include vinyl acetate and vinyl propionate. Examples of alkyl (meth)acrylates include methyl acrylate, ethyl acrylate, butyl acrylate, 2-ethylhexyl acrylate, methyl methacrylate, ethyl methacrylate, butyl methacrylate, and 2-ethylhexyl methacrylate. In some aspects, the $C_{1-12}$ alkyl (meth)acrylate repeating units are methyl acrylate. In some aspects, the α,β-unsaturated glycidyl ester copolymer impact modifier is a copolymer of a α,β-unsaturated glycidyl ester repeating units and α-olefin repeating units. In other aspects, the α,β-unsaturated glycidyl ester copolymer impact modifier is a terpolymer of α,β-unsaturated glycidyl ester repeating units, α-olefin repeating units, and a vinyl ester repeating units, $C_{1-12}$ alkyl (meth)acrylate repeating units, or a combination thereof. In some aspects, the α,β-unsaturated glycidyl ester copolymer impact modifier comprises 60 to 99 wt % α-olefin repeating units, 0.1 to 20 wt % α,β-unsaturated glycidyl ester repeating units, and 0 to 39 wt % of vinyl ester repeating units, $C_{1-12}$ alkyl (meth)acrylate repeating units, or a combination thereof. The α,β-unsaturated glycidyl ester copolymer impact modifiers can include poly(ethylene-co-glycidyl acrylate) (E-GA), poly(ethylene-co-glycidyl methacrylate) (E-GMA), poly(ethylene-co-glycidyl methacrylate-co-methyl acrylate) (E-GMA-MA), poly(ethylene-co-glycidyl methacrylate-co-ethyl acrylate) (E-GMA-EA), poly(ethylene-co-glycidyl methacrylate-co-vinyl acetate) (E-GMA-VA), or a combination thereof. In some aspects, the α,β-unsaturated glycidyl ester copolymer impact modifier is poly(ethylene-co-glycidyl methacrylate), poly(ethylene-co-methyl acrylate-co-glycidyl methacrylate), or a combination thereof. Commercially available α,β-unsaturated glycidyl ester copolymer impact modifiers include LOTADER AX8840 (E-GMA), and LOTADER AX8900, LOTADER AX8920, and LOTADER AX8950 (E-GMA-MA).

The α,β-unsaturated glycidyl ester copolymer impact modifier can be present from 1-10 wt %, 2-9 wt %, 2-8 wt %, or 3-7 wt %, each based on the total weight of the thermoplastic polycarbonate composition.

The thermoplastic composition can further include auxiliary impact modifier(s). Suitable auxiliary impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of auxiliary impact modifiers can be used.

A specific type of auxiliary impact modifier is an elastomer-modified graft copolymer comprising (i) an elastomeric (i.e., rubbery) polymer substrate having a Tg less than 10° C., more preferably less than −10° C., or more preferably −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene or styrene; or combinations thereof. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, preferably methyl methacrylate.

Specific elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Auxiliary impact modifiers can be present in amounts of 1 to 10 wt %, 0.5 to 5 wt %, 1.5 to 5 wt %, 2 to 5 wt %, or 2 to 3 wt % of the thermoplastic polycarbonate composition, each based on the total weight of the thermoplastic polycarbonate composition. In some aspects, the auxiliary impact modifier is absent.

The thermoplastic polycarbonate composition includes a hydrostabilizer. In some aspects, the hydrostabilizer is an epoxy hydrostabilizer. The epoxy hydrostabilizer can have a Mw of 2,500 to 8,500 g/mol, or 3,000 to 6,000 g/mol. The epoxy hydrostabilizer can have an epoxy equivalent weight (EEW) of 180 to 2800 g/mol, or 190 to 1400 g/mol, or 200 to 700 g/mol. In an aspect, the epoxy hydrostabilizer can comprise styrenic and acrylic groups, for example as described in US 2013/0131255 and U.S. Pat. No. 6,984,694 and commercially available under the trade names JON-CRYL (e.g., JONCRYL ADR 4368 (a styrene-acrylate copolymer with epoxy functionality). Other epoxy hydrostabilizers include JONCRYL ADR 4300 (epoxidized soybean oil). The epoxy hydrostabilizer can be present from 0.01-1.0 wt %, 0.01-0.5 wt %, 0.01-0.3 wt %, 0.1-0.3 wt %, or 0.1-0.2 wt %, each based on the total weight of the thermoplastic polycarbonate composition.

The thermoplastic polycarbonate composition can include various additives ordinarily incorporated into polymer compositions of this type, with the proviso that the additive(s) are selected so as to not significantly adversely affect the desired properties of a thermoplastic composition, in particular electrical tracking resistance, flame retardant performance, and/or low-temperature impact properties. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of an anti-drip agent, a UV stabilizer, and a colorant. In general, the additives are used in the amounts generally known to be effective. The additive composition can be present from 0.01 to 10 wt %, 0.01-5.0 wt %, or 0.01-3 wt %, each based on the total weight of the thermoplastic polycarbonate composition.

The thermoplastic polycarbonate compositions can be manufactured by various methods known in the art. For example, the powdered polycarbonate(s), and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

As discussed above, the thermoplastic polycarbonate compositions are formulated to have excellent physical properties, including excellent hydrolytic stability. Hydrolytic stability concerns the ability of a product to withstand chemical decomposition through hydrolysis, for instance by maintaining molecular weight after prolonged exposure to water. For high-end applications, such as at voltages of 1500, good hydrolytic stability and electrical tracking performance that does not compromise impact and flame retardant performance is desirable.

A molded sample of the thermoplastic polycarbonate composition can retain greater than 85%, greater than 90%, greater than 95%, greater than 97%, or greater than 98% molecular weight after 1000 hours in a hydrolytic chamber at 85° C. and 85% relative humidity. A molded sample of the thermoplastic polycarbonate composition can retain greater than 79%, greater than 80%, greater than 85%, greater than 90% molecular weight after 1500 h in a hydrolytic chamber at 85° C. and 85% relative humidity. A molded sample of the thermoplastic polycarbonate composition can retain greater than 73%, greater than 75%, greater than 80%, greater than 85% molecular weight after 2000 hours in a hydrolytic chamber at 85° C. and 85% relative humidity. A molded sample of the thermoplastic polycarbonate composition can retain greater than 62%, greater than 65%, or greater than 70% molecular weight after 3000 hours in a hydrolytic chamber at 85° C. and 85% relative humidity.

A molded sample of the thermoplastic polycarbonate composition can retain at least 80%, at least 85%, at least 90%, at least 95%, at least 97%, or at least 98% molecular weight after 1000 hours in a hydrolytic chamber at 85° C. and 85% relative humidity. A molded sample of the thermoplastic polycarbonate composition can retain at least 60%, preferably at least 70%, 80%, 90%, or 95% notched Izod impact strength as measured at 23° C. according to ASTM D256 after 692 hours in a hydrolytic chamber at 85° C. and 85% relative humidity. A molded sample of the thermoplastic polycarbonate composition can retain at least 55%, preferably at least 60%, 65%, 70%, 75%, 80%, or 85% notched Izod impact strength as measured at 23° C. according to ASTM D256 after 1000 hours in a hydrolytic chamber at 85° C. and 85% relative humidity.

The thermoplastic polycarbonate compositions can have excellent electrical tracking performance. In some aspects, at 600 V, the number of drops required to cause tracking can be greater than or equal to 50 drops, greater than or equal to 60 drops, greater than or equal to 70 drops, greater than or equal to 75 drops, greater than or equal to 80 drops, greater than or equal to 85 drops, or greater than or equal to 90 drops determined according to ASTM D-3638-85. In some aspects, at 300 V, the number of drops required to cause tracking can be greater than or equal to 50 drops, greater than or equal to 60 drops, greater than or equal to 70 drops, greater than or equal to 75 drops, greater than or equal to 80 drops, greater than or equal to 85 drops, greater than or equal to 90 drops, determined according to ASTM D-3638-85.

A molded sample of the thermoplastic polycarbonate composition can have good low-temperature impact properties. A molded sample of the thermoplastic polycarbonate composition having a thickness of 3.2 millimeters can have a Notched Izod Impact (NIT) strength of greater than 260 Joules/meter (J/m), greater than 300 J/m, greater than 350 J/m, greater than 400 J/m, greater than 450 J/m, greater than 500 J/m, from greater than 260 to 650 J/m, from greater than 260 to 600 J/m, from greater than 260 to 550 J/m, from greater than 260 to 500 J/m, from greater than 260 to 450 J/m, from greater than 260 to 400 J/m, or from greater than 260 to 350 J/m, in accordance with ASTM D256 at −30° C. A molded sample of the thermoplastic poly carbonate composition having a thickness of 3.2 millimeters can have a Notched Izod Impact (NII) strength of greater than 180 Joules/meter (J/m), greater than 200 J/m, greater than 250 J/m, greater than 300 J/m, greater than 350 J/m, greater than 400 J/m, greater than 450 J/m, greater than 500 J/m, greater than 180 to 600 J/m, greater than 180 to 550 J/m, greater than 180 to 500 J/m, greater than 180 to 450 J/m, greater than 180 to 400 J/m, greater than 180 to 350 J/m, or greater than 180 to 300 J/m in accordance with ASTM D256 at −40° C.

A molded sample of the thermoplastic polycarbonate composition can have a heat deflection temperature (HDT) of greater than 123° C. determined on one-eighth inch (3.18 mm) bars per ASTM D648 at 1.82 MPa.

An aged molded sample (23° C., 48 h, then 70° C., 168 h) can have a UL-94 flammability test rating of V0 at 1.5 millimeter.

This disclosure is further illustrated by the following examples, which are non-limiting.

EXAMPLES

The following components are used in the examples. Unless specifically indicated otherwise, the amount of each component is in wt %, based on the total weight of the composition.

The materials shown in Table 1 were used.

TABLE 1

| Component | Description | Source |
|---|---|---|
| PC-1 | Bisphenol A polycarbonate homopolymer, prepared by interfacial process, Mw = 29,900-31,000 g/mol as per GPC using bisphenol A homopolycarbonate standards, having the tradename C023A. | SABIC |
| PC-2 | Bisphenol A polycarbonate homopolymer, prepared by interfacial process, Mw = 21,000-23,000 g/mol as per GPC using bisphenol A homopolycarbonate standards, having the tradename C017. | SABIC |
| PC-3 | Bisphenol A polycarbonate homopolymer, prepared by melt process, amorphous; Mw = 29,900-31,000 g/mol as per GPC using bisphenol A homopolycarbonate standards, having the tradename 102L. | SABIC |
| PC-4 | Amorphous bisphenol A polycarbonate homopolymer, prepared by melt process, Mw = 21,000-23,000 g/mol as per GPC using bisphenol A homopolycarbonate standards, having the tradename 172L. | SABIC |
| Br-PC | BPA-co-2,6-tetrabromo BPA copolycarbonate,, CAS Reg. No. 156042-31-8, 26 wt % bromine content, Mw = 23,600 as per GPC using bisphenol A homopolycarbonate standards, having the tradename PC105B | SABIC |
| PPC | Poly(bisphenol A carbonate-bisphenol A phthalate) having 19-21 wt % bisphenol A carbonate units and 79-81 wt % bisphenol A phthalate groups with an isophthalate:terephthalate ratio of 93:7; Tg = 174° C.; Mw = 27,000-29,000 g/mol as per GPC using bisphenol A homopolycarbonate standards, having the tradename C016. | SABIC |
| IM-Si | Core-shell impact modifier having a silicone elastomer core and an methyl(methacrylate) (MMA) copolymer shell, CAS Reg. No. 143106-82-5, having a particle size of 200-400 nm, available as METABLEN S-2501 | MITSUBISHI RAYON CO |
| EGMA | Poly(ethylene-co-glycidyl methacrylate), CAS Reg. No. 26,061-90-5, having an ethylene-glycidyl methacrylate weight ratio of 92:8; obtained as LOTADER AX8840. | Arkema |
| EMAGMA | Poly(ethylene-co-methyl methacrylate-co-glycidyl methacrylate), CAS Reg. No. 51541-08-3, having an ethylene-methyl acrylate-glycidyl methacrylate weight ratio of 67:25:8; obtained as LOTADER AX8900. | Arkema |
| TSAN | Encapsulated Polytetrafluoroethylene, CAS Reg. No. 9002-84-0, having the tradename TSAN, with 47-53 wt % poly(tetrafluoroethylene) | SABIC |
| CESA | Styrene-acrylate-epoxy oligomer (hydrostabilizer), CAS No. 106-91-2 (JONCRYL ADR 4368) | BASF |
| PETS | Pentaerythritol tetrastearate, >90% esterified | Faci |
| Phosphite | Tris(2,4-di-tert-butylphenyl) phosphite, available as IRGAFOS 168 | BASF |
| AO | Hindered phenolic antioxidant, available as IRGANOX 1076 | BASF |

The testing samples were prepared as described below and the following test methods were used.

Typical compounding procedures are described as follows: All raw materials are pre-blended and then extruded using a twin extruder. The composition was melt-kneaded, extruded, cooled through a water bath and pelletized. A typical extrusion profile is listed in Table 2.

TABLE 2

| Parameter | Unit | Value |
|---|---|---|
| Die | mm | 3 |
| Zone 1 Temp | ° C. | 50 |
| Zone 2 Temp | ° C. | 100 |
| Zone 3-11 Temp | ° C. | 270 |
| Die Temp | ° C. | 270 |
| Screw speed | rpm | 400 |
| Throughput | kg/hr | 40 |
| Side feeder speed | rpm | 250 |

The extruded pellets were molded into testing specimens after drying the extruded pellets at 120° C. for 3 hours using injection molding (for parameters see Table 3).

TABLE 3

| Parameters | Unit | CTI test chip | Izod bar | Flame bar |
|---|---|---|---|---|
| Cnd: Pre-drying time | Hour | 3 | 3 | 3 |
| Cnd: Pre-drying temp | ° C. | 120 | 120 | 120 |
| Hopper temp | ° C. | 50 | 50 | 50 |
| Zone 1 temp | ° C. | 300 | 275 | 300 |
| Zone 2 temp | ° C. | 300 | 280 | 300 |
| Zone 3 temp | ° C. | 300 | 285 | 300 |
| Nozzle temp | ° C. | 300 | 280 | 300 |
| Mold temp | ° C. | 100 | 75 | 100 |
| Screw speed | rpm | 100 | 100 | 100 |
| Back pressure | kgf/cm$^2$ | 68 | 68 | 68 |
| Injection speed | mm/s | 30 | 30 | 30 |
| Max. injection pressure | kgf/cm$^2$ | 1200 | 1200 | 1200 |
| Molding Machine | NONE | FANUC | FANUC | Netstal |
| Mold Type | NONE | Color chip step 1/2 | Axxicon Izod | ULA-1.5 mm |

Sample preparation and testing methods are described in Table 4.

TABLE 4

| Property | Standard | Conditions | Specimen Type |
|---|---|---|---|
| Mw | SABIC | GPC | Bar-63.5 mm × 12.7 mm × 3.2 mm |
| CTI | ASTM D3638 | 600 V, 300 V | Color chip-90 mm × 1 mm/2 mm |
| Notched Izod | ASTM D256 | 23° C., 3.2 mm | Bar-63.5 mm × 12.7 mm × 3.2 mm |
| Flammability | UL 94 | Vertical Burning | Bar-127 mm × 12.7 mm × 3 mm/1 mm |

Electrical tracking performance was assessed by measuring proof tracking index (PTI) according to ASTM D3638 (600 V, using a 90 mm×1 mm or 2 mm color chip), in which a 0.1% ammonium chloride solution was added dropwise to a sample surface at a rate of one drop per 30 seconds. A passing result was achieved when the number of drops at least 50 was required.

For hydrolytic stability assessments, Izod bars were placed into a hydrolytic chamber at 85° C. and 85% relative humidity (RH) for pre-determined time intervals. The samples were then removed from the ovens for characterization of molecular weight (Mw) and impact properties. Hydrolytic stability was assessed by comparison of the weight average molecular weight of polycarbonate before and after hydrolytic stress as described above. The data was converted to % retention of the initial Mw and the data are shown in the following tables indicated as "Dual 85, Mw retention." Mw was determined by gel permeation chromatography (GPC). Hydrolytic stability was assessed by comparison of Notched Izod impact strength (NII) at 23° C. of a formulation before and after hydrolytic stress. The data was converted to % retention of the initial NII and the data are shown in the following tables indicated as "Dual 85, NII (2° C.) retention."

Impact properties were evaluated by Notched Izod impact testing (NII) at temperatures of 23° C., −30° C., and −40° C. according to ASTM D256 using bars (63.5 mm×12.7 mm×3.2 mm).

Melt volume rate (MVR) was determined at 300° C. using a 1.2-kilogram weight, over 10 minutes, in accordance with ASTM D1238-04.

Heat deflection temperature (HDT) was determined on one-eighth inch (3.18 mm) bars per ASTM D648 at 1.82 MPa.

Flammability tests were performed on aged samples (23° C., 48 h, then 70° C., 168 h) at a thickness of 0.8 mm in accordance with the Underwriter's Laboratory (UL) UL 94 standard. In some cases, a second set of 5 bars was tested to give an indication of the robustness of the rating. In this report the following definitions are used as shown in Table 5. Total flame-out-times for all 5 bars (FOT=t1+t2) were determined. V-ratings were obtained for every set of 5 bars.

TABLE 5

| | $t_1$ and/or $t_2$ | 5-bar FOT | burning drips |
|---|---|---|---|
| V0 | <10 | <50 | no |
| V1 | <30 | <250 | No |
| V2 | <30 | <250 | Yes |
| N.R. (no rating) | >30 | >250 | |

Examples C1-E4

Table 6 shows the compositions and properties for C1-E4.

TABLE 6

| Components | Units | C1 | E1 | E2 | E3 | E4 |
|---|---|---|---|---|---|---|
| PC-1 (interfacial) | wt % | 20 | 20 | 20 | 20 | 20 |
| PC-2 (interfacial) | wt % | 79.04 | 59.04 | 58.89 | 0 | 0 |
| Br PC | wt % | | 20 | 20 | 20 | 20 |
| PPC | wt % | | | | 59.04 | 58.89 |
| PETS | wt % | 0.3 | 0.3 | 0.3 | 0.3 | 0.3 |
| UVA | wt % | 0.3 | 0.3 | 0.3 | 0.3 | 0.3 |
| TSAN | wt % | 0.3 | 0.3 | 0.3 | 0.3 | 0.3 |
| AO | wt % | 0.06 | 0.06 | 0.06 | 0.06 | 0.06 |
| CESA | wt % | | | 0.15 | | 0.15 |
| Properties | | | | | | |
| MVR | cm³/10 min | 9.9 | 10.8 | 10.4 | 3.9 | 3.8 |
| HDT 1.82 MPa | ° C. | 125 | 130 | 130 | 143 | 142 |
| NII, 23° C. | J/m | 883 | 101 | 113 | 101 | 97 |
| NII, −30° C. | J/m | 123 | 84 | 83 | 85 | 85 |
| CTI 600 V | average drops | 100 | 64 | 68 | 43 | 76 |
| CTI 300 V | average drops | 99 | 34 | 33 | 20 | 20 |
| Mw, DH85 0 h | g/mol | 52231 | 49971 | 50292 | 49125 | 50739 |
| Mw, DH85 1000 h | g/mol | 45758 | 41258 | 45728 | 43201 | 48256 |
| Mw, DH85 2000 h | g/mol | 41760 | 37257 | 42621 | 39254 | 46076 |
| Mw, DH85 3000 h | g/mol | 39101 | 34504 | 40371 | 34738 | 42093 |
| Mw retention, DH85 0 h | | 100% | 100% | 100% | 100% | 100% |
| Mw retention, DH85 1000 h | | 88% | 83% | 91% | 88% | 95% |

TABLE 6-continued

| Components | Units | C1 | E1 | E2 | E3 | E4 |
|---|---|---|---|---|---|---|
| Mw retention, DH85 2000 h | | 80% | 75% | 85% | 80% | 91% |
| Mw retention DH85 3000 h | | 75% | 69% | 80% | 71% | 83% |

Addition of 20 wt % Br—PC to mixtures of PC homopolymers PC-1 and PC-2 significantly decreased CTI at 600 V and 300 V and impact resistance (compare E1 with C1). Addition of 0.15 wt % hydrolytic stabilizer (CESA) significantly improved Mw retention, while maintaining CTI and impact resistance (see E1, E2). Replacing a portion of PC-2 with PPC failed to improve CTI at 300 V or 600 V, but improved DH85 (compare E3 with E1). The combination of CESA and poly(phthalate ester-carbonate) (PPC) improved DH85 performance, but CTI at 300 V was adversely affected (compare E4 with E2 and E3). To summarize, all formulations in this group maintained Mw retention, but the impact resistance at −30° C. and the CTI 300 V were insufficient.

Examples C2-E9

Table 7 shows the compositions and properties for C2-E9.

Compositions having Br—PC, PC-2, PPC, and a core-shell impact modifier having a silicone elastomer core and an MMA copolymer shell (IM-Si) significantly improved the impact resistance at −30° C. and −40° C., but both the CTI at 300 V and DH85 values were insufficient (compare E5 with C2). The addition of EGMA or EMAGMA resulted in a slight improvement in impact resistance at −30° C. and −40° C., a decrease in CTI at 600 V, and an improvement in CTI at 300 V (compare E6 and E7 with C2). The combination of IM-Si and EMAGMA resulted in a decrease in CTI values (compare E8 with E7). The addition of a combination of IM-Si and EMAGMA to a mixture of PC-2, PC-3, and Br—PC resulted in an improved impact resistance and CTI values (compare E9 with E8). To summarize, all formulations in this group except E5 can meet Mw retention in Dual 85 test, but only E8 and E9 have sufficient impact resistance and E9 also has sufficient CTI values.

TABLE 7

| Components | Units | E4 | E5 | E6 | E7 | E8 | E9 |
|---|---|---|---|---|---|---|---|
| PC-2 | wt % | 20 | 20 | 20 | 20 | 20 | 20 |
| Br-PC | wt % | 20 | 20 | 20 | 20 | 20 | 20 |
| PPC | wt % | 58.89 | 51.89 | 53.89 | 53.89 | 46.89 | 0 |
| PC-3 | wt % | | | | | | 46.89 |
| PETS | wt % | 0.3 | 0.3 | 0.3 | 0.3 | 0.3 | 0.3 |
| UVA | wt % | 0.3 | 0.3 | 0.3 | 0.3 | 0.3 | 0.3 |
| TSAN | wt % | 0.3 | 0.3 | 0.3 | 0.3 | 0.3 | 0.3 |
| AO | wt % | 0.06 | 0.06 | 0.06 | 0.06 | 0.06 | 0.06 |
| CESA | wt % | 0.15 | 0.15 | 0.15 | 0.15 | 0.15 | 0.15 |
| IM-Si | wt % | | 7 | | | 7 | 7 |
| EGMA | wt % | | | 5 | | | |
| EMAGMA | wt % | | | | 5 | 5 | 5 |
| Properties | | | | | | | |
| MFR | cm$^3$/10 min | 3.8 | 3.8 | 1.9 | 1.9 | 1.6 | 2.73 |
| HDT, 1.82 MPa | ° C. | 142 | 135 | 140 | 140 | 132 | 123 |
| NII 23° C. | J/m | 97 | 485 | 536 | 549 | 448 | 596 |
| NII −30° C. | J/m | 85 | 236 | 167 | 145 | 309 | 517 |
| NII −40° C. | J/m | 79 | 191 | 135 | 125 | 281 | 455 |
| CTI 600 V | average drops | 76 | 56 | 27 | 79 | 49 | 60 |
| CTI 300 V | average drops | 20 | 35 | 48 | 22 | 38 | 68 |
| Mw, DH85 0 h | g/mol | 50739 | 47861 | 48940 | 48740 | 46491 | 47061 |
| Mw, DH85 1000 h | g/mol | 48256 | 41217 | 45445 | 44918 | 43476 | 44622 |
| Mw, DH85 1500 h | g/mol | 47413 | 36986 | 42529 | 41821 | 41822 | 42162 |
| Mw, DH85 2000 h | g/mol | 46076 | 32459 | 38355 | 38752 | 38623 | 40078 |
| Mw, DH85 3000 h | g/mol | 42093 | 22636 | 31672 | 32171 | 31147 | 33688 |
| Mw retention, DH85 0 h | | 100% | 100% | 100% | 100% | 100% | 100% |
| Mw retention, DH85 1000 h | | 95% | 86% | 93% | 92% | 94% | 95% |
| Mw retention, DH85 1500 h | | 93% | 77% | 87% | 86% | 90% | 90% |
| Mw retention, DH85 2000 h | | 91% | 68% | 78% | 80% | 83% | 85% |
| Mw retention, DH85 3000 h | | 83% | 47% | 65% | 66% | 67% | 72% |

Examples E10-E16

Table 7 shows the compositions and properties for Examples 10-16.

TABLE 7

| Components | Units | E10 | E11 | E12 | E13 | E14 | E15 | E16 |
|---|---|---|---|---|---|---|---|---|
| PC-2 | wt % | 0 | 20 | 0 | 0 | 0 | 0 | 0 |
| Br-PC | wt % | 20 | 20 | 20 | 20 | 20 | 20 | 20 |
| PC-4 | wt % | 20 | 20 | 30 | 40 | 30 | 30 | 30 |
| PPC | wt % | 46.89 | 26.89 | 36.89 | 26.89 | 33.89 | 29.89 | 30.89 |
| PETS | wt % | 0.3 | 0.3 | 0.3 | 0.3 | 0.3 | 0.3 | 0.3 |
| UVA | wt % | 0.3 | 0.3 | 0.3 | 0.3 | 0.3 | 0.3 | 0.3 |
| TSAN | wt % | 0.3 | 0.3 | 0.3 | 0.3 | 0.3 | 0.3 | 0.3 |
| AO | wt % | 0.06 | 0.06 | 0.06 | 0.06 | 0.06 | 0.06 | 0.06 |
| CESA | wt % | 0.15 | 0.15 | 0.15 | 0.15 | 0.15 | 0.15 | 0.15 |
| IM-Si | wt % | 7 | 7 | 7 | 7 | 7 | 7 | 10 |
| EMAGMA | wt % | 5 | 5 | 5 | 5 | 8 | 12 | 8 |
| Properties | | | | | | | | |
| MVR | cm$^3$/10 min | 2.23 | 2.39 | 2.73 | 2.36 | 1 | 3.6 | 0.89 |
| HDT 1.82 MPa | °C. | 130 | 126 | 128 | 126 | 127 | 126 | 125 |
| UL94, 1.5 mm | | | V0 | V0 | V0 | Fail | Fail | Fail |
| NII 23° C. | J/m | 487 | 459 | 495 | 525 | 557 | 518 | 550 |
| NII −30° C. | J/m | 312 | 289 | 300 | 316 | 338 | 406 | 462 |
| NII −40° C. | J/m | 273 | 238 | 287 | 285 | 281 | 292 | 310 |
| CTI, 600 V | Avg. drops | 66 | 90 | 75 | 56 | 74 | 18 | 48 |
| CTI, 300 V | Avg. drops | 100 | 60 | 44 | 41 | 35 | 43 | 42 |
| Mw, DH85 0 h | g/mol | 45173 | 46419 | 46150 | 46582 | 47333 | 47796 | 46853 |
| Mw, DH85 1000 h | g/mol | 40060 | 43759 | 42569 | 44210 | 44906 | 45522 | 43911 |
| Mw, DH85 1500 h | g/mol | 37805 | 42419 | 39557 | 42864 | 43481 | 44588 | 42188 |
| Mw retention, DH85 0 h | | 100% | 100% | 100% | 100% | 100% | 100% | 100% |
| Mw retention, DH85 1000 h | | 89% | 94% | 92% | 95% | 95% | 95% | 94% |
| Mw retention, DH85 1500 h | | 84% | 91% | 86% | 92% | 92% | 93% | 90% |

By replacing PPC with PC-2, CTI at 300 V and 600 V was maintained and Mw was improved (compare E11 with E10). However, replacing some of the PPC with PC-4 adversely affected CTI at 300 V (compare E12-13 with E10). Increasing EMAGMA resulted in a slight improvement in impact resistance, but adversely affected CTI (see E14-E15). E16 vs E14: Increasing IM-Si further improved the impact resistance, but CTI at 600 V was significantly decreased. To summarize, all formulations in this group can meet Mw retention in Dual 85 test and meet NII −30° C. and NII −40° C. requirement (>260 J/m and >180 J/m, respectively). Both E10 and E11 show robust performance for both CTI 300 V and 600 V and E11-E13 have UL94 flame test ratings of V0 at a thickness of 1.5 mm.

This disclosure further encompasses the following aspects.

Aspect 1: A thermoplastic polycarbonate composition comprising: 10 to 30 wt % of a brominated polycarbonate; 10 to 80 wt % of a homopolycarbonate; optionally, 1 to 60 wt % of an aromatic poly(ester-carbonate) comprising carbonate units derived from bisphenol A, resorcinol, or a combination thereof, and ester units derived from a bisphenol, preferably bisphenol A, or resorcinol, and terephthalic acid, isophthalic acid, or a combination thereof, wherein a molar ratio of carbonate units to ester units ranges from 1:99 to 99:1; 5 to 15 wt % of a core-shell impact modifier; 1 to 10 wt % of an α,β-unsaturated glycidyl ester copolymer impact modifier; 0.01 to 1 wt % of a hydrostabilizer, preferably an epoxy hydrostabilizer; optionally, 0.1 to 10 wt % of an additive composition; wherein the wt % of each component is based on the total weight of the composition, which totals 100 wt %.

Aspect 2: The thermoplastic polycarbonate composition of Aspect 1, wherein a molded sample of the composition: does not show tracking after at least 50 drops of an aqueous 0.1% ammonium chloride solution measured at 300 volts as determined by ASTM D-3638-85, does not show tracking after at least 50 drops of an aqueous 0.1% ammonium chloride solution measured at 600 volts as determined by ASTM D-3638-85, having a thickness of 3.2 millimeters has a notched Izod impact of greater than 260 joules per meter at −30° C. according to ASTM D256, and having a thickness of 3.2 millimeters has a notched Izod impact of greater than 180 joules per meter at −40° C. according to ASTM D256.

Aspect 3: The thermoplastic polycarbonate composition of Aspects 1 or 2, wherein a molded sample of the composition having a thickness of 3.2 millimeters has a heat deflection temperature of at least 123° C. according to ASTM D648 at 1.82 megapascals; has a UL 94 flame test rating of V0 at 1.5 millimeter; or a combination thereof.

Aspect 4: The thermoplastic polycarbonate composition of any one of the preceding aspects, wherein a molded sample of the composition: retains greater than 85% of a molecular weight after 1000 hours in a hydrolytic chamber at 85° C. and 85% relative humidity; retains greater than 79% of a molecular weight after 1500 hours in a hydrolytic chamber at 85° C. and 85% relative humidity; retains greater than 73% of a molecular weight after 2000 hours in a hydrolytic chamber at 85° C. and 85% relative humidity; retains greater than 62% of a molecular weight after 3000 hours in a hydrolytic chamber at 85° C. and 85% relative humidity; or a combination thereof.

Aspect 5: The thermoplastic polycarbonate composition of any one of the preceding aspects, wherein the brominated polycarbonate has a bromine content of 24 to 27.5 wt %, based on the total weight of the brominated polycarbonate, preferably wherein the brominated polycarbonate comprises brominated bisphenol A polycarbonate units.

Aspect 6: The thermoplastic polycarbonate composition of any one of the preceding aspects, wherein the aromatic poly(ester-carbonate) is present and is a poly(carbonate-bisphenol phthalate ester) comprising 1-50 wt % of aromatic carbonate units and 50-99 wt % of bisphenol phthalate ester units, each based on the sum of the weight of the carbonate units and the bisphenol phthalate ester units.

Aspect 7: The thermoplastic polycarbonate composition of any one of the preceding aspects, wherein the aromatic poly(ester-carbonate) is present and has the formula

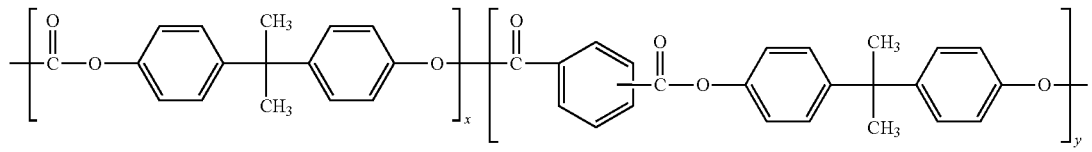

wherein a weight ratio of carbonate units x to ester units y is 10:90-45:55, and the ester units have a molar ratio of isophthalate to terephthalate from 98:2-88:12.

Aspect 8: The thermoplastic polycarbonate composition of any one of the preceding aspects, wherein a weight ratio of carbonate units x to ester units y is 75:25-85:15.

Aspect 9: The thermoplastic polycarbonate composition of any one of the preceding aspects, wherein the core-shell impact modifier comprises a silicone elastomer core and a methyl(methacrylate) copolymer shell; the $\alpha,\beta$-unsaturated glycidyl ester copolymer impact modifier comprises poly(ethylene-co-glycidyl acrylate), poly(ethylene-co-glycidyl methacrylate), poly(ethylene-co-glycidyl methacrylate-co-methyl acrylate), poly(ethylene-co-glycidyl methacrylate-co-ethyl acrylate), poly(ethylene-co-glycidyl methacrylate-co-vinyl acetate), or a combination thereof, preferably, poly(ethylene-co-glycidyl methacrylate), poly(ethylene-co-methyl acrylate-co-glycidyl methacrylate), or a combination thereof or a combination thereof.

Aspect 10: The thermoplastic polycarbonate composition of any one of the preceding aspects, wherein the homopolycarbonate is: a bisphenol A homopolycarbonate having a weight average molecular weight from 18,000-35,000 grams/mole, preferably 20,000-25,000 grams/mole; or a bisphenol A homopolycarbonate having a weight average molecular weight from 25,000-35,000 grams/mole, preferably 27,000-32,000 grams/mole; or a combination thereof, each as measured via gel permeation chromatography using bisphenol A homopoly carbonate standards.

Aspect 11: The thermoplastic polycarbonate composition of any one of the preceding aspects comprising: 10 to 30 wt % of a brominated polycarbonate; 10 to 30 wt % of a bisphenol A homopolycarbonate made by an interfacial process; 30 to 60 wt % of a bisphenol A homopoly carbonate made by a melt process; 5 to 15 wt % of a core-shell silicone-(meth)acrylate impact modifier; 1 to 10 wt % of the $\alpha,\beta$-unsaturated glycidyl ester copolymer impact modifier; and 0.1 to 1.0 wt % of the epoxy hydrostabilizer; wherein the wt % of each component is based on the total weight of the composition, which totals 100 wt %.

Aspect 12: The thermoplastic polycarbonate composition of any one of the preceding aspects comprising: 10 to 30 wt % of the brominated polycarbonate; 20 to 40 wt % of a bisphenol A homopolycarbonate made by a melt process; 20 to 40 wt % of the aromatic poly(ester-carbonate); 5 to 15 wt % of a core-shell silicone-(meth)acrylate impact modifier; 1 to 10 wt % of the $\alpha,\beta$-unsaturated glycidyl ester copolymer impact modifier; and 0.1 to 1.0 wt % of the epoxy hydrostabilizer; wherein the wt % of each component is based on the total weight of the composition, which totals 100 wt %.

Aspect 13: The thermoplastic polycarbonate composition of any one of the preceding aspects comprising: 10 to 30 wt % of the brominated polycarbonate; 30 to 50 wt % of a bisphenol A homopolycarbonate made by a melt process; 10 to 30 wt % of a bisphenol A homopolycarbonate made by an interfacial process; 35 to 55 wt % of the aromatic poly(ester-carbonate); 5 to 15 wt % of a core-shell silicone-(meth)acrylate impact modifier; 1 to 10 wt % of the $\alpha,\beta$-unsaturated glycidyl ester copolymer impact modifier; and 0.1 to 1.0 wt % of the epoxy hydrostabilizer; wherein the wt % of each component is based on the total weight of the composition, which totals 100 wt %.

Aspect 14: An article comprising the thermoplastic polycarbonate composition of any one of the preceding aspects, preferably wherein the article is an electrical component, more preferably an electrical connector.

Aspect 15: A method for forming the article according to Aspect 14, comprising molding, casting, or extruding the composition to provide the article.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some aspects", "an aspect", and so forth, means that a particular element described in connection with the aspect is included in at least one aspect described herein, and may or may not be present in other aspects. In addition, it is to be understood that the described elements may be combined in any suitable manner in the various aspects. A "combination thereof" is open and includes any combination comprising at least one of the listed components or properties optionally together with a like or equivalent component or property not listed.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl)a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example—CH$_2$CH$_2$CN is a $C_2$ alkyl group substituted with a nitrile.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A thermoplastic polycarbonate composition comprising:

10 to 30 wt % of a brominated polycarbonate having- a bromine content of 10 to 50 wt %, based on the total weight of the brominated polycarbonate;

10 to 80 wt % of a homopolycarbonate;

optionally, 1 to 60 wt % of an aromatic poly(ester-carbonate) comprising carbonate units derived from bisphenol A, resorcinol, or a combination thereof, and ester units derived from a bisphenol, wherein a molar ratio of carbonate units to ester units ranges from 1:99 to 99:1;

5 to 15 wt % of a core-shell impact modifier;

1 to 10 wt % of an α,β-unsaturated glycidyl ester copolymer impact modifier;

0.01 to 1 wt % of a hydrostabilizer;

optionally, 0.1 to 10 wt % of an additive composition;

wherein the wt % of each component is based on the total weight of the composition, which totals 100 wt %.

2. The thermoplastic polycarbonate composition of claim 1, wherein a molded sample of the composition does not show tracking after at least 50 drops of an aqueous 0.1% ammonium chloride solution measured at 300 volts as determined by ASTM D-3638-85, does not show tracking after at least 50 drops of an aqueous 0.1% ammonium chloride solution measured at 600 volts as determined by ASTM D-3638-85, having a thickness of 3.2 millimeters has a notched Izod impact of greater than 260 joules per meter at −30° C. according to ASTM D256, and having a thickness of 3.2 millimeters has a notched Izod impact of greater than 180 joules per meter at −40° C. according to ASTM D256.

3. The thermoplastic polycarbonate composition of claim 1, wherein a molded sample of the composition having a thickness of 3.2 millimeters has a heat deflection temperature of at least 123° C. according to ASTM D648 at 1.82 megapascals;

has a UL 94 flame test rating of VO at 1.5 millimeter; or a combination thereof.

4. The thermoplastic polycarbonate composition of claim 1, wherein a molded sample of the composition:

retains greater than 85% of a molecular weight after 1000 hours in a hydrolytic chamber at 85° C. and 85% relative humidity;

retains greater than 79% of a molecular weight after 1500 hours in a hydrolytic chamber at 85° C. and 85% relative humidity;

retains greater than 73% of a molecular weight after 2000 hours in a hydrolytic chamber at 85° C. and 85% relative humidity;

retains greater than 62% of a molecular weight after 3000 hours in a hydrolytic chamber at 85° C. and 85% relative humidity;

or a combination thereof.

5. The thermoplastic polycarbonate composition of claim 1, wherein the brominated polycarbonate has a bromine content of 24 to 27.5 wt %, based on the total weight of the brominated polycarbonate.

6. The thermoplastic polycarbonate composition of claim 1, wherein the aromatic poly(ester-carbonate) is present and is a poly(carbonate-bisphenol phthalate ester) comprising 1-50 wt % of aromatic carbonate units and 50-99 wt % of bisphenol phthalate ester units, each based on the sum of the weight of the carbonate units and the bisphenol phthalate ester units.

7. The thermoplastic polycarbonate composition of claim 1, wherein the aromatic poly(ester-carbonate) is present and has the formula

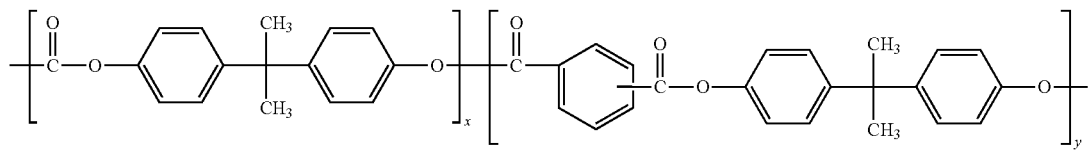

wherein
a weight ratio of carbonate units x to ester units y is 10:90-45:55, and
the ester units have a molar ratio of isophthalate to terephthalate from 98:2-88:12.

8. The thermoplastic polycarbonate composition of claim 1, wherein a weight ratio of carbonate units x to ester units y is 75:25-85:15.

9. The thermoplastic polycarbonate composition of claim 1,
wherein
the core-shell impact modifier comprises a silicone elastomer core and a methyl(methacrylate) copolymer shell;
the α,β-unsaturated glycidyl ester copolymer impact modifier comprises poly(ethylene-co-glycidyl acrylate), poly(ethylene-co-glycidyl methacrylate), poly(ethylene-co-glycidyl methacrylate-co-methyl acrylate), poly(ethylene-co-glycidyl methacrylate-co-ethyl acrylate), poly(ethylene-co-glycidyl methacrylate-co-vinyl acetate), or a combination thereof, preferably, poly(ethylene co glycidyl methacrylate), poly(ethylene co methyl acrylate co glycidyl methacrylate), or a combination thereof;
or a combination thereof.

10. The thermoplastic polycarbonate composition of claim 1,
wherein
the homopolycarbonate is:
a bisphenol A homopolycarbonate having a weight average molecular weight from 18,000-35,000 grams/mole; or
a bisphenol A homopolycarbonate having a weight average molecular weight from 25,000-35,000 grams/mole;
or a combination thereof, each as measured via gel permeation chromatography using bisphenol A homopolycarbonate standards.

11. The thermoplastic polycarbonate composition of claim 1 comprising
10 to 30 wt % of a brominated polycarbonate;
10 to 30 wt % of a bisphenol A homopolycarbonate made by an interfacial process;
30 to 60 wt % of a bisphenol A homopolycarbonate made by a melt process;
5 to 15 wt % of a core-shell silicone-(meth)acrylate impact modifier;
1 to 10 wt % of the α,β-unsaturated glycidyl ester copolymer impact modifier; and
0.1 to 1.0 wt % of the epoxy hydrostabilizer;
wherein the wt % of each component is based on the total weight of the composition, which totals 100 wt %.

12. The thermoplastic polycarbonate composition of claim 1 comprising
10 to 30 wt % of the brominated polycarbonate;
20 to 40 wt % of a bisphenol A homopolycarbonate made by a melt process;
20 to 40 wt % of the aromatic poly(ester-carbonate);
5 to 15 wt % of a core-shell silicone-(meth)acrylate impact modifier;
1 to 10 wt % of the α,β-unsaturated glycidyl ester copolymer impact modifier; and
0.1 to 1.0 wt % of the epoxy hydrostabilizer;
wherein the wt % of each component is based on the total weight of the composition, which totals 100 wt %.

13. The thermoplastic polycarbonate composition of claim 1 comprising
10 to 30 wt % of the brominated polycarbonate;
30 to 50 wt % of a bisphenol A homopolycarbonate made by a melt process;
10 to 30 wt % of a bisphenol A homopolycarbonate made by an interfacial process;
35 to 55 wt % of the aromatic poly(ester-carbonate);
5 to 15 wt % of a core-shell silicone-(meth)acrylate impact modifier;
1 to 10 wt % of the α,β-unsaturated glycidyl ester copolymer impact modifier; and
0.1 to 1.0 wt % of the epoxy hydrostabilizer;
wherein the wt % of each component is based on the total weight of the composition, which totals 100 wt %.

14. An article comprising the thermoplastic polycarbonate composition of claim 1.

15. A method for forming the article according to claim 14, comprising molding, casting, or extruding the composition to provide the article.

16. The thermoplastic polycarbonate composition of claim 1, wherein the brominated polycarbonate comprises brominated bisphenol A polycarbonate units.

17. The thermoplastic polycarbonate composition of claim 1, wherein the hydrostabilizer is an epoxy hydrostabilizer.

18. The article of claim 14, wherein the article is an electrical component.

19. The article of claim 14, wherein the article is an electrical connector.

* * * * *